United States Patent [19]

Fleischer et al.

[11] 4,419,289

[45] Dec. 6, 1983

[54] ISOTHIAZOLE TYPE AZO DYES CONTAINING IMIDAZO TYPE COUPLERS

[75] Inventors: Jean C. Fleischer; Gary T. Clark; Max A. Weaver, all of Kingsport, Tenn.

[73] Assignee: Eastman Kodak Company, Rochester, N.Y.

[21] Appl. No.: 356,991

[22] Filed: Mar. 11, 1982

Related U.S. Application Data

[62] Division of Ser. No. 128,209, Mar. 7, 1980, Pat. No. 4,354,970.

[51] Int. Cl.³ .................. C09B 29/039; C09B 29/36; C09B 29/46; C09B 29/48
[52] U.S. Cl. .................................. 260/158; 260/153; 260/154; 260/155; 260/156; 260/157; 260/162; 260/163; 260/165
[58] Field of Search .............. 260/158, 157, 165, 155, 260/153, 154, 156, 162, 163

[56] References Cited

U.S. PATENT DOCUMENTS

| | | | |
|---|---|---|---|
| 3,143,540 | 8/1964 | Meen et al. | 260/155 |
| 3,634,391 | 1/1972 | Fisher et al. | 260/162 |
| 3,928,309 | 12/1975 | Clark | 260/146 R |
| 3,936,435 | 2/1976 | Clark | 260/146 R |
| 4,104,268 | 8/1978 | Dorsch et al. | 260/158 |
| 4,252,716 | 2/1981 | Kuhlthau | 260/158 |
| 4,330,467 | 5/1982 | Fleische et al. | 260/155 |

Primary Examiner—Floyd D. Higel
Attorney, Agent, or Firm—Donald W. Spurrell; Daniel B. Reece, III

[57] ABSTRACT

Disclosed are novel azo dyes containing an isothiazole azo moiety which may be substituted, and a heterocyclic coupler which also may be substituted. The dyes produce yellow shades on, for example, hydrophobic textile fiber including polyesters, polyamides, and cellulose esters and have excellent fastness properties including lightfastness, washfastness and resistance to sublimation, and dye at unusually low energy levels. The dyes have the general formulae:

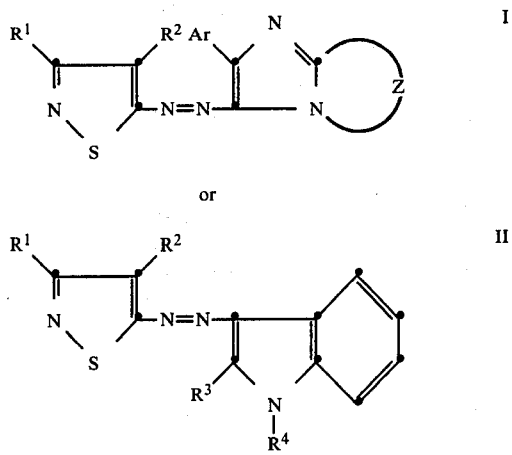

wherein the various substituents, $R^1$ and $R^2$ are each selected from hydrogen and a wide variety of groups such as lower alkyl, —CN, halogen, and the like, $R^3$ and $R^4$ are each selected from hydrogen, lower alkyl, benzyl and phenyl, and Z represents the atoms necessary to complete a five or six membered ring.

4 Claims, No Drawings

ISOTHIAZOLE TYPE AZO DYES CONTAINING IMIDAZO TYPE COUPLERS

This is a division of Application Ser. No. 128,209, filed Mar. 7, 1980, now U.S. Pat. No. 4,354,970 issued Oct. 19, 1982.

This invention relates to novel azo dyes containing an azo isothiazole moiety which may be substituted, and a heterocyclic coupler which also may be substituted. The dyes produce yellow shades on hydrophobic textile fiber including polyesters, polyamides, and cellulose esters and show unexpected improvements in one or more of such properties as fastness to light, wash, ozone, gas such as oxides of nitrogen, perspiration, crock, sublimation, dyeability at unusually low energy levels to deep shades and exhibit excellent build, pH stability, bloom resistance, leveling, migration, dye bath exhaustion, dye transfer, and the like, over such prior art as disclosed in U.S. Pat. Nos. 3,928,311; 3,143,540; and 3,804,823.

The dyes of this invention have the following general formulae:

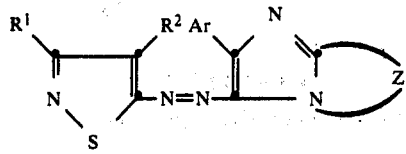

or

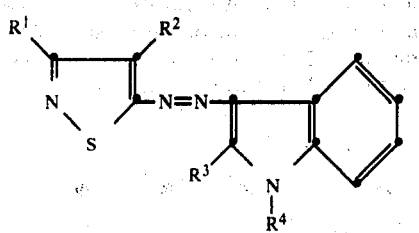

wherein $R^1$ and $R^2$ are each selected from cyano, bromo, hydrogen, chloro, formyl, lower alkoxycarbonyl, lower alkyl, lower alkylsulfonyl, thiocyanto, carbamoyl, lower alkylcarbamoyl, and lower alkanoyl; $R^3$ and $R^4$ are each selected from hydrogen, lower alkyl, benzyl and phenyl; and Z represents the atoms necessary to complete a five or six membered ring.

The carbocyclic aryl groups represented by Ar can be unsubstituted or substituted with lower alkyl, lower alkoxy, halogen, hydroxy, lower alkylamino, nitro, cyano and the like. Specific examples of such phenyl groups include but are not limited to phenyl, p-tolyl, m-ethylphenyl, p-anisyl, p-chlorophenyl, o-bromo-p-tolyl, o,p-dichlorophenyl, p-cyanophenyl.

The carbon atoms of the groups represented by Z can be substituted or disubstituted. Typical examples of the ring atoms that Z can represent are

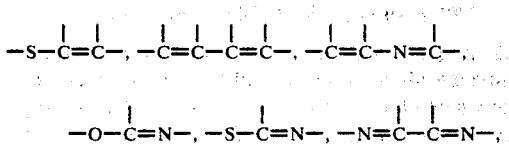

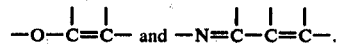

The carbon atoms of the divalent groups represented by Z can be substituted with various substituents including a fused carbocyclic ring which may also be substituted. Examples of such substituents are hydrogen, oxygen, lower alkyl, lower alkoxy, halogen, lower alkylsulfonyl, thiocyanato, alkylthio, etc. As used herein to describe a substituent containing an alkyl or alkylene moiety, the word "lower" designates a carbon content of one to four carbon atoms. Typical of the groups represented by the divalent chain Z include the following groups

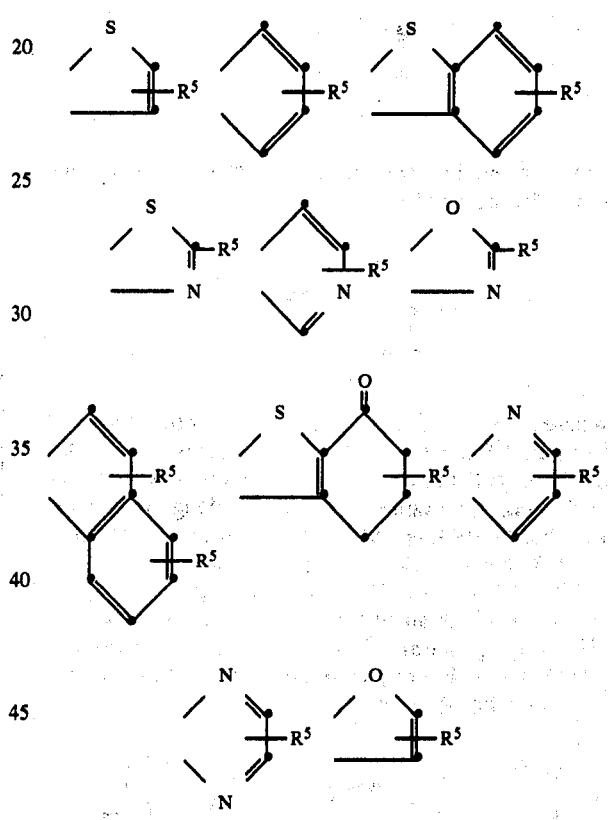

wherein $R^5$ represents a group selected from hydrogen, lower alkyl, lower alkoxy, halogen, and preferably, not more than two substituents.

A preferred group of the coupler components of the novel compounds of the invention have the formula

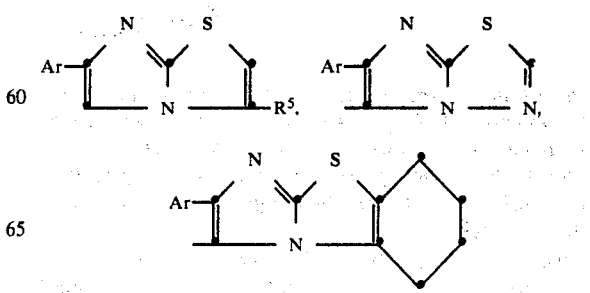

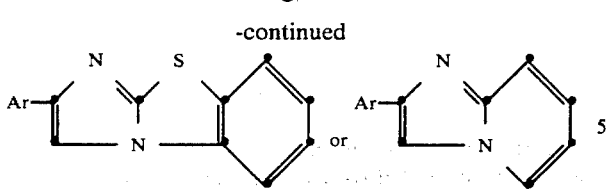

wherein Ar represents phenyl or phenyl substituted with lower alkyl; and $R^5$ represents hydrogen and lower alkyl. Especially preferred are the coupler components conforming to the above structure to which $R^5$ is attached.

The monoazo compounds of the invention are prepared by diazotizing an amine having the formula:

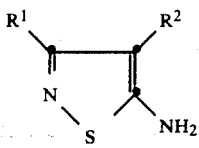

and coupling the resulting diazonium salt with a compound having the formula

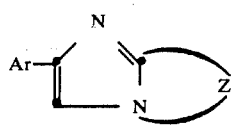

wherein Ar and Z are defined above. The amines of Formula III and the coupling procedures that can be used are well known in the art of dye chemistry as evidenced, for example, by the teachings of Chem. Berichte 96, 1963, pp 1551–1561, and Journal of Heterocyclic Chemistry, Oct. 1975, pp 883–887.

The couplers of Formula IV are prepared by methods, or methods analogous to those described in the literature, e.g., see also U.S. Ser. No. 661,215. The reaction by which the couplers are prepared is illustrated by the following equation:

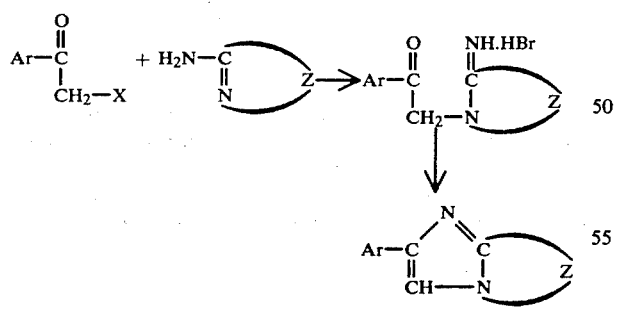

In addition to the examples below, the preparation of the couplers used for preparing the novel compounds of the invention are also described in A. Chem. 2, 153 (1962); C.A., 58, 453 g; Ber., 95, 1128 (1962); Ber., 60, 1607 (1927); and J. Pharm. Soc. Japan, 57, 1050 (1937); C.A. 32, 33,985.

The invention will be further illustrated by the following examples although it will be understood that these examples are included merely for purposes of illustration and is not intended to limit the scope of the invention.

EXAMPLE 1

6,6-Dimethyl-8-Keto-2-Phenyl-5,6,7,8-Tetrahydroimidazo[2,1-b]Benzothiazole

A 0.08 m. quantity each of 2-amino-5,5-dimethyl-7-keto-4,5,6,7-tetrahydrobenzothiazole and α-bromoacetophenone are mixed in 150 ml. of chloroform and heated at reflux for 4 hours. The slurry is filtered hot and the insoluble intermediate product is suspended in 600 ml. of water containing 25 g. of sodium acetate. This suspension is heated slowly to boil over 2½ hours, then allowed to cool. The product is filtered off, washed well with water and dried yielding 12.5 g. of product melting at 175°–178° C. and having the structure:

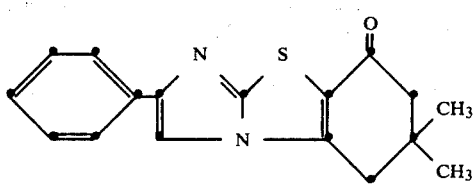

EXAMPLE 2

2-Phenylimidazo[1,2-a]Pyrimidine

An equimolar mixture of 2-aminopyrimidine and α-bromoacetophenone are heated in absolute ethanol for several hours at 60°–70° C. Anhydrous ether is added to precipitate the hydrobromide of the product. The free base, melting at 202° C., is obtained by the action of aqueous $Na_2CO_3$ solution and has the formula

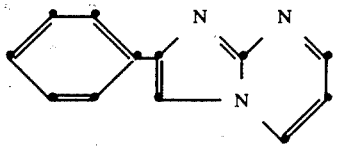

EXAMPLE 3

7-Methyl-2-Phenylimidazo[1,2-c]Pyrimidine

Substitution of 4-amino-6-methylpyrimidine in Example 2 yields a coupler which melts at 244° C. and has the structure:

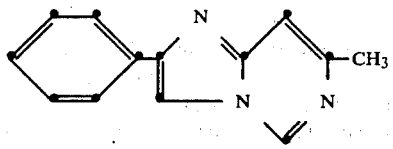

EXAMPLE 4

2-Phenylimidazo[2,1-b]Benzothiazole

A 0.2 m. quantity each of 2-aminobenzothiazole and α-bromoacetophenone are mixed in 350 ml. of chloroform and heated at reflux for 1½ hours. After cooling, the solid intermediate product is filtered off and slurried in 2 l. of water containing 10 ml. of 48% hydrobromic acid. This is then heated to a boil, filtered hot, and after allowing to cool the filtrate is basified with NH₄OH to yield 6.8 g. of 2-phenylimidazo[2,1-b]benzothiazole melting at 108°–10° C. and having the formula:

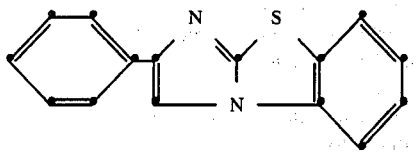

EXAMPLE 5

2-Phenylimidazo[1,2-a]Pyridine 0.1 m. Quantities of 2-aminopyridine and α-bromoacetophenone are heated in 150 ml. of chloroform at reflux for 2 hours. The chloroform is evaporated and the oily residue taken up in 10% HCl, warmed, charcoal added and filtered. The filtrate is neutralized with NH₄OH and the solid product isolated and recrystallized from ethanol. The yield of product is 12.7 g., melts at 135°–137° C. and has the structure:

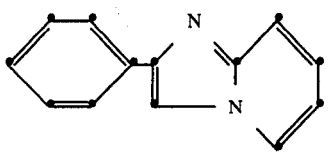

EXAMPLE 6

2-Phenyl-5,6,7,8-Tetrahydroimidazo[2,1-b]Benzothiazole 0.1 m. Quantities of 2-amino-4,5,6,7-tetrahydrobenzothiazole and α-bromoacetophenone in 100 ml. of chloroform are heated at reflux for 2 hours. After cooling, the solid is filtered off and slurred in 1 l. of water containing 40 g. of ammonium acetate. This suspension is heated to boiling over a 2-hour period and allowed to cool. The product is collected, washed with water and dried. The yield of product is 19.8 g. melting at 158°–160° C. and having the formula:

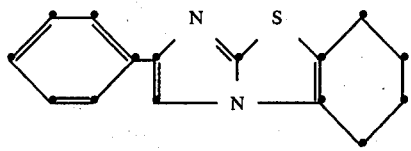

EXAMPLE 7

6-Phenylimidazo[2,1-b]-1,3,4-Thiadiazole 10.1 g. of 2-amino-1,3,4-thiadiazole are dissolved in 160 ml. of ethanol, 19.9 g. of α-bromoacetophenone is added and the solution is heated and stirred at reflux for 1 hour. After cooling, the solid is filtered off and dissolved in 750 ml. of water and 40 ml. of 48% hydrobromic acid. This solution is heated at reflux for 1 hour, neutralized by addition of solid ammonium acetate and refluxed ½ hour longer. After cooling, the product is collected on a filter, washed with water and dried. The yield of product is 13 g. melting at 127°–130° C. It has the formula:

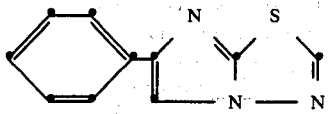

EXAMPLE 8

6-Phenylimidazo[2,1-b]thiazole

Bromine (21.5 ml.) is added to a solution of 50 g. of acetophenone and 0.1 g. of anhydrous AlCl₃ in 200 ml. of chlorobenzene. The addition requires about 20 minutes and the temperature of the reaction solution rises to about 35° C. Dry air is bubbled through the solution until all the gaseous HBr is removed. 2-Aminothiazole (24 g.) is added and the reaction mixture stirred and heated on a steam bath for 1 hour. The thick reaction mixture is filtered while still hot and the filter cake washed with hexane. The dry product is slurried in 200 ml. of methanol and then diluted with a solution of 80 g. ammonium acetate in 1600 ml. of water. This suspension is stirred and heated to 80° C., then filtered and the product thus obtained is washed with 4 l. of water. The yield is 70 g. of product which melts at 143°–144° C. and has the structure:

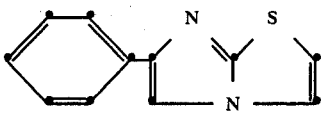

Additional couplers can be prepared by employing techniques either published in the literature or analogous to those described in the preceding examples.

The dyes of this invention can be applied to synthetic polyamide, polyester and cellulose acetate fibers according to known disperse dyeing techniques. Various dispersing and wetting agents can be employed in the dispersion of the finely divided dye compound in an essentially aqueous dyebath. Procedures by which the present dyes can be applied to polyamide textile materials are described, for example, in U.S. Pat. Nos. 3,100,134 and 3,320,021. Typically, the azo compound (16.7 mg.) is dispersed in 10 cc. of 2-methoxyethanol. A small amount (3–5 cc.) of a 3% sodium lignin sulfonate solution is added, with stirring, and the volume of the bath brought to 150 cc. with water. A 5 g. textile fabric made of nylon 66 fibers is placed in the bath and worked 10 minutes without heat. The bath is then slowly brought to the boil over a 30-minute period and then dyeing is carried out at the boil for one hour. The dyed fabric is then removed from the dyebath, rinsed with water and dried in an oven at 250° F. Fabric samples thus dyed with the present dyes exhibit one or more of the improved properties set forth above when tested in accordance with the procedures described, for example, in the Technical Manual of the American Association of Textile Chemists and Colorists, 1968 edition.

A typical general procedure by which polyester, e.g., poly(ethylene terephthalate) can be dyed with the present dyes is as follows. The dye cake is dispersed by heating and agitating a dyepot containing the dye cake and methyl cellosolve. When the dyecake has been ground free of lumps and dissolved as much as possible in the methyl cellosolve, 2% based on weight of the fabric of Igepon T-51 and 2.0% based on weight of the fabric of sodium lignin sulfonate from a premixed solution of the two components is added. Sufficient demineralized water is added to make about a 30:1 bath ratio of water to dye and a small amount of Versene 100 (sodium salt of ethylenediaminetetracetic acid) and Tanalon JDM-72 (dye carrier) are added. The pH of the dyebath is adjusted to about 5.0 with acetic acid. The fabric samples (wet-out) are entered into the dyepot and the entire contents thereof entered into a pressure dyeing container. The container is sealed and entered into a High Temperature Launder-Ometer which is heated to 120° F. and rotation thereof started. The temperature of the Launder-Ometer is raised to 265° F. at the rate of about 5° F. per minute, and maintained at this temperature for 1 hour. The Launder-Ometer is then cooled, and the fabric samples removed and scoured in demineralized water containing 1 g/l of neutral soap and 1 g/l sodium carbonate. The samples are rinsed in cold demineralized water and dried at 250° F. in a forced air oven.

The following table shows exemplary dyes of the present invention.

TABLE 1

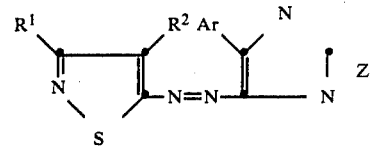

| Example | $R^1$ | $R^2$ | Ar | Z |
|---|---|---|---|---|
| 1 | H | H | $C_6H_5$ | $-S-CH=CH-$ |
| 2 | H | H | $C_6H_5$ | " |
| 3 | $CH_3$ | CHO | $C_6H_5$ | " |
| 4 | $CH_3$ | $COCH_3$ | $C_6H_5$ | " |
| 5 | $CH_3$ | Cl | $C_6H_5$ | " |
| 6 | $CH_3$ | CN | $C_6H_5$ | " |
| 7 | $CH_3$ | $COOC_2H_5$ | $C_6H_5$ | " |
| 8 | $CH_3$ | $CONHC_2H_4OH$ | $C_6H_5$ | $-S-C_6H_5$ |
| 9 | $COOCH_3$ | Br | $C_6H_5$ | (pyrrole-like ring) |
| 10 | Br | H | $C_6H_5$ | " |
| 11 | $CH_3$ | Br | $C_6H_5$ | $-S-C_6H_4-OCH_3$ |
| 12 | $CH_3$ | Cl | $C_6H_5$ | $-S-CH=N-$ |
| 13 | $CH_3$ | Br | $C_6H_5$ | $-S-C(CH_3)(CH_2CH_2CH_2)=C-$ |

TABLE 1-continued
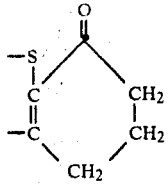
| Example | R¹ | R² | Ar | Z |
|---|---|---|---|---|
| 14 | COCH₃ | Br | C₆H₅ | 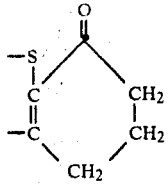 |
| 15 | CH₃ | Br | 4-Br—C₆H₅ | 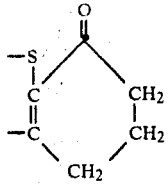 |
| 16 | CH₃ | Br | 4,5-di(OH)C₆H₃ | " |
| 17 | CH₃ | Br | 4-dimethylamino-C₆H₄ | " |
| 18 | CH₃ | Br | C₆H₅ | " |
| 19 | CH₃ | Br | C₆H₅ | " |
| 20 | Cl | H | C₆H₅ | " |
| 21 | CH₃ | COC₂H₅ | C₆H₅ | " |
| 22 | CH₃ | COC₂H₅ | C₆H₅ |  |
| 23 | CH₃ | CN | C₆H₅ |  |
| 24 | CH₃ | CN | C₆H₅ | " |
| 25 | CH₃ | CONH₂ | 4-Br—C₆H₄ |  |
| 26 | CH₃ | CN | C₆H₅ |  |
| 27 | CH₃ | SO₂C₂H₅ | C₆H₅ | " |
| 28 | CH₃ | SCN | C₆H₅ | " |
| 29 | CH₃ | SCN | 4-NO₂—C₆H₄ | " |
| 30 | CHO | SCN | 4-NO₂—C₆H₄ | " |
| 31 | CH₃ | SO₂CH₃ | C₆H₅ |  |
| 32 | C₂H₅ | CN | C₆H₅ |  |
| 33 | C₂H₅ | CN | 4-OCH₃—C₆H₄ | " |

TABLE 1-continued

[Structure: thiazole ring with R¹, R² substituents, Ar group, and Z group connected via -N=N- azo linkage to pyrimidine-like ring]

| Example | R¹  | R²          | Ar     | Z |
|---------|-----|-------------|--------|---|
| 34 | H | H | C₆H₅ | −O−CH=CH− |
| 35 | H | H | C₆H₅ | −O−CH=C(CH₃)− |
| 36 | CH₃ | CHO | C₆H₅ | (pyridine ring with N) |
| 37 | CH₃ | Cl | C₆H₅ | (pyridine ring with N) |
| 38 | CH₃ | CONHC₂H₄OH | C₆H₅ | (cyclohexanone with −O−) |
| 39 | Br | H | C₆H₅ | (fused benzene ring) |
| 40 | H | H | C₆H₅ | (oxazole ring, O and N) |
| 41 | H | H | C₆H₅ | (pyrimidine ring, two N) |

65

TABLE 2

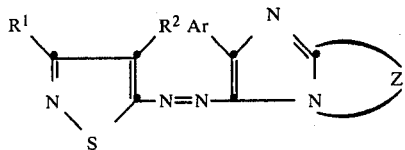

| Example | R¹ | R² | R³ | R⁴ |
|---|---|---|---|---|
| 1 | H | H | H | H |
| 2 | $CH_3$ | Br | $CH_3$ | $CH_3$ |
| 3 | $CH_3$ | CHO | $C_6H_5$ | H |
| 4 | $CH_3$ | $CONH_2$ | $CH_3$ | $CH_2C_6H_5$ |
| 5 | $CH_3$ | Cl | $C_6H_5$ | $C_2H_5$ |
| 6 | $CH_3$ | CN | H | H |
| 7 | $CH_3$ | $COOC_2H_5$ | $CH_3$ | $CH_3$ |
| 8 | $CH_3$ | $CONHC_2H_4OH$ | $C_6H_5$ | H |
| 9 | $CH_3$ | Br | $CH_3$ | $CH_2C_6H_5$ |
| 10 | $C_2H_5$ | Br | $C_6H_5$ | $C_2H_5$ |
| 11 | $CH_3$ | Cl | H | H |
| 12 | $CH_3$ | SCN | $CH_3$ | $CH_3$ |
| 13 | $CH_3$ | $COCH_3$ | $C_6H_5$ | H |
| 14 | $CH_3$ | $COC_2H_5$ | $CH_3$ | $CH_2C_6H_5$ |
| 15 | $CH_3$ | Br | $C_6H_5$ | $C_2H_5$ |
| 16 | $CH_3$ | $SO_2CH_3$ | H | H |
| 17 | $CH_3$ | CN | $CH_3$ | $CH_3$ |
| 18 | $CH_3$ | CN | $C_6H_5$ | $CH_3$ |
| 19 | $CH_3$ | Br | $C_6H_5$ | H |

The invention has been described in detail with particular reference to preferred embodiments thereof, but it will be understood that variations and modifications can be effected within the spirit and scope of the invention.

We claim:

1. A compound having the formula

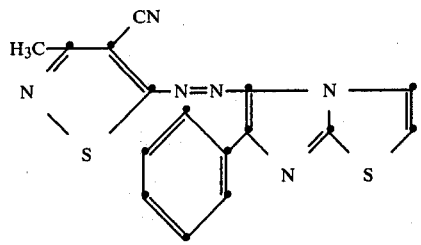

wherein R¹ and R² are each selected from cyano, bromo, hydrogen, chloro, formyl, lower alkoxycarbonyl, lower alkyl, lower alkylsulfonyl, thiocyano, carbamoyl, lower alkylcarbamoyl, and lower alkanoyl; Z represents the atoms necessary to complete a fixe or six membered ring which is unsubstituted or substituted with nitrogen, oxygen, sulfur or a combination thereof; and Ar is a benzene ring which is unsubstituted or substituted with up to three of lower alkyl, lower alkoxy, halogen, hydroxy, lower alkylamino, nitro or cyano.

2. A compound according to claim 1 wherein Z is selected from

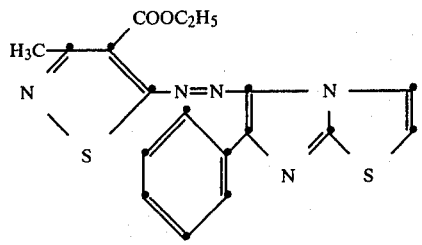

wherein $R^5$ represents a group selected from hydrogen, lower alkyl, lower alkoxy and halogen.

3. A compound according to claim 1 having the formula

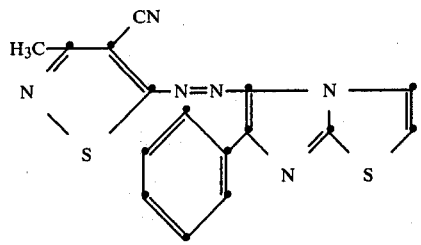

4. A compound according to claim 1 having the formula

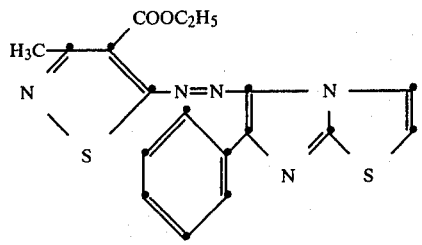

* * * * *